United States Patent
Fruehauf et al.

(10) Patent No.: US 7,149,308 B1
(45) Date of Patent: Dec. 12, 2006

(54) CRYPTOGRAPHIC COMMUNICATIONS USING IN SITU GENERATED CRYPTOGRAPHIC KEYS FOR CONDITIONAL ACCESS

(75) Inventors: Hugo Fruehauf, Laguna Niguel, CA (US); Derek C. Au, Huntington Beach, CA (US); Thomas Bartholet, Laguna Hills, CA (US)

(73) Assignee: StealthKey, Inc., Anaheim, CA (US)

( * ) Notice: Subject to any disclaimer, the term of this patent is extended or adjusted under 35 U.S.C. 154(b) by 517 days.

(21) Appl. No.: 09/711,783

(22) Filed: Nov. 13, 2000

(51) Int. Cl.
*H04L 9/00* (2006.01)

(52) U.S. Cl. .......................... 380/44; 380/47; 380/46; 380/277; 380/278; 380/279; 380/281; 380/262; 380/268

(58) Field of Classification Search .................. 380/46, 380/281, 44, 239, 240, 200, 277–279, 262, 380/268, 47; 725/31
See application file for complete search history.

(56) References Cited

U.S. PATENT DOCUMENTS

| | | | | |
|---|---|---|---|---|
| 4,634,808 A | * | 1/1987 | Moerder | 380/29 |
| 4,809,327 A | * | 2/1989 | Shima | 380/44 |
| 4,864,615 A | * | 9/1989 | Bennett et al. | 380/239 |
| 5,115,467 A | * | 5/1992 | Esserman et al. | 380/44 |
| 5,345,508 A | * | 9/1994 | Lynn et al. | 380/46 |
| 5,412,730 A | * | 5/1995 | Jones | 380/46 |
| 5,519,778 A | * | 5/1996 | Leighton et al. | 380/30 |
| 5,574,789 A |   | 11/1996 | Nakamura et al. | |
| 5,590,200 A | * | 12/1996 | Nachman et al. | 380/46 |
| 5,748,734 A | * | 5/1998 | Mizikovsky | 380/247 |
| 5,764,771 A | * | 6/1998 | De Vito et al. | 380/28 |
| 5,787,172 A | * | 7/1998 | Arnold | 713/175 |
| 5,802,175 A | * | 9/1998 | Kara | 380/277 |
| 5,999,623 A | * | 12/1999 | Bowman et al. | 380/239 |
| 6,084,969 A | * | 7/2000 | Wright et al. | 380/271 |
| 6,191,701 B1 | * | 2/2001 | Bruwer | 340/5.22 |
| 6,289,455 B1 | * | 9/2001 | Kocher et al. | 713/194 |
| 6,463,155 B1 | * | 10/2002 | Akiyama et al. | 380/278 |
| 6,748,082 B1 | * | 6/2004 | Vieweg et al. | 380/278 |
| 6,788,788 B1 |   | 9/2004 | Kasahara | |
| 6,915,434 B1 | * | 7/2005 | Kuroda et al. | 713/193 |
| 6,985,583 B1 | * | 1/2006 | Brainard et al. | 380/44 |

FOREIGN PATENT DOCUMENTS

WO     WO 01/91366 A2    11/2001

* cited by examiner

*Primary Examiner*—Kim Vu
*Assistant Examiner*—Beemnet W Dada
(74) *Attorney, Agent, or Firm*—Morrison & Foerster LLP

(57) ABSTRACT

A system and method for cryptographic communication among multiple users and a central service provider using in situ generated cryptographic keys. Each user communicates with the central service provider preferably using a user communication interface that includes an in situ key generator, which, after initialization with the user's own individual seed value, generates a unique cryptographic key. By distributing different user individual seeds unique to each user, each user's in situ key generator generates a unique set of keys. The central service provider also possesses an in situ key generator, and also preferably possesses a copy of all the individual seeds assigned to authorized users. The central service provider preferably communicates in a secure encrypted fashion with each user using cryptographic keys generated from that user's individual seed. Distribution of additional seed values common to more than one user, via encrypted communication using said unique individual cryptographic key generations, then permit secure conditional access to said users via signal encryption using key generations resulting from a seed value common to the intended group of users.

9 Claims, 2 Drawing Sheets

CRYPTOGRAPHIC COMMUNICATIONS USING IN SITU GENERATED CRYPTOGRAPHIC KEYS FOR CONDITIONAL ACCESS

BACKGROUND OF THE INVENTION

1. Field of the Invention

The present invention relates to an apparatus and method for a pseudo-random cryptography key generator in a cryptographic communication system such as the pseudo-random key generator ("PKG") as described in patent applications "System and Method for Secure Cryptographic Communications," Ser. No. 09/510,540, and "Cryptographic Communications using Pseudo-Randomly generated Cryptography Keys," Ser. No. 09/574,345, both of which are incorporated by reference herein. The present invention described herein is especially useful as the preferred method (but not limited to) for securing conditional access network applications in which cryptographic algorithms are used to secure data communications and transmissions

2. Description of the Background Art

Conventionally, information transmitted through electronic media is generally not secure and is vulnerable to interception by a third party. For example, a telephone conversation between two people over public telephone wires may be susceptible to "tapping" by a third party. In another instance, an e-mail transmitted over the Internet can be "intercepted" by an unknown entity, who may later use the information contained in the e-mail to the detriment of the author and/or recipient of the e-mail. This is especially the case for home or office media users, which may have thousands of users on the same cable, copper, wireless or fiber media. Accordingly, information intended to be confidential should either be transmitted through a secure communication channel, or be transmitted in a format such that, even if the information is intercepted by an unauthorized party, the information is unintelligible to the unauthorized party.

A conventional method of maintaining the confidentiality of communication involves the use of cryptographic algorithms that encrypt and decrypt the information being communicated. The encryption process, typically involving the use of a cryptographic algorithm, makes the information transmitted through a channel undecodable or undecipherable to unintended recipients. In order to decipher the encrypted information, a recipient must possess a unique piece of information (i.e., a "key") that can be used with the cryptographic algorithms to successfully decrypt the encrypted message. More specifically, an encryption key is typically a data string which, when combined with another set of data according to an algorithm, produces a data output that is unintelligible to third parties. To decipher the data output, one must use a decryption key that can be used to decrypt the encrypted data. In many instances, the encryption key is identical to the decryption key for a given algorithm.

In a conventional cryptographic communication system based on the use of keys, the appropriate keys must be distributed to the sender as well as the receiver before secure transmission can occur. Operations and services related to the use and distribution of keys within a cryptographic communication system are commonly referred to as key management. More specifically, a key management infrastructure creates, distributes, authenticates/certifies, and often changes and/or revokes the encryption/decryption keys used within a particular cryptographic communication system. Key management can be accomplished either manually or by using automated computer programs. It is intended in a conventional cryptographic communication system that only the authorized recipient, being in possession of the appropriate decryption key, will be able to decipher the encrypted data that is sent. Accordingly, to maintain the security of a cryptographic communication system, an effective key management infrastructure must prevent unintended recipients from acquiring knowledge of the encryption and/or decryption keys in order to ensure that unauthorized parties cannot decipher the information being transmitted.

As previously discussed, in a conventional cryptographic communication system, the appropriate keys must first be distributed for use by the sender and the receiver before any cryptographic communication can take place. In many instances, keys must be distributed to multiple receivers. The process of key distribution may result in either unintentional disclosure of the keys to third parties or interception of the keys by other entities. Furthermore, a conventional cryptographic system that does not change keys on a frequent basis may eventually become vulnerable to computer "hackers," who, given sufficient time, can use powerful computers to decipher the encryption algorithm and derive the encryption keys. Thus, periodic key changes are intended to enhance security, but they also burden conventional key management systems and can jeopardize security through risk of exposure during the key distribution process.

To decrease the likelihood of someone deciphering the encrypted information, designers of conventional encryption systems typically enhance security protection by using stronger encryption algorithms that are based on longer encryption codes, changing keys on a more frequent basis, and/or implementing a more sophisticated key management infrastructure. Nevertheless, even an enhanced cryptographic communication system is susceptible to a breach by a hacker, especially in today's world of powerful computers. Furthermore, changing keys on a more frequent basis creates additional opportunities for the keys to be disclosed or intercepted by unauthorized parties. Finally, complex key management infrastructures that change and distribute keys on a frequent basis increase logistics and the cost of maintaining a cryptographic communication system.

SUMMARY OF THE INVENTION

The inventions described in the referenced patents enhance significantly the security of cryptographic communication systems by applying an innovative alternative to conventional methods of key management. In particular, the inventions facilitate a communications infrastructure within which communication transmissions are secured using in situ generated encryption and decryption keys, using in situ key generators that can be deployed at communication and storage locations in a secured communication system, substantially eliminating any need for key distribution and capable of keeping the keys unknown to some or all parties involved. For example, a pseudo-random key generator ("PKG") according to the preferred embodiments of the inventions generates % a set of key sequences based on a pseudo-random method such that, for any given period of time, pseudo-random key generators with identical set-up configurations generate a key unique for that time period, and this unique key is the same among the authorized user community possessing identically configured key generators.

The present invention described herein focuses on unique applications of in situ cryptographic key generators as they relate to installable and selectable initialization or set-up configurations of such key generators in order to permit general or selective encryption/decryption, i.e., conditional access, among the members of an authorized community possessing the key generators. In order to decrypt any received, encrypted data, the receiving device preferably includes an in situ key generator with values of all set-up configuration parameters identical to those of the in situ key generator used at the sending device. Both key generators also preferably satisfy other requirements, if any, such as synchronization based on time, event or event value during the period of operation. Thus, if all such in situ key generators connected within an user community have identical configurations and meet any other requirements during the period of operation, then all such users will be able to decrypt and encrypt content in common with all the other users. If one or more parameters of the set-up configuration of any given in situ key generator are different from those of the other key generators, then the user with that particular key generator will not be able to decrypt or encrypt content in common with other users, even if any other operating requirements are met. If a subset of users uniquely share a particular combination of values of set-up configuration parameters, then that subset of users will be uniquely able to decrypt and encrypt content sent among them when their in situ key generators configured with that combination of parameters. For in situ key generators are capable of being configured with a variety of combinations of set-up configuration parameters, encrypted communication among all users or only various subsets of users may successfully occur as desired based on the availability and use of the needed configuration parameters at each intended user's key generator. With secure distribution of one or more values of set-up configuration parameters to particular users, the available combinations of set-up parameters for configuration of any user's in situ key generator can be altered to allow such a particular user to additionally encrypt or decrypt content via set-up configurations of his or her in situ key generator which result from use of the newly distributed parameters. Selective distribution of new values of configuration parameters then creates new subsets of users who may successfully and uniquely encrypt and decrypt content via in situ key generators configured with combinations of set-up parameters which include those newly distributed parametric values. Access to encrypted content by any given user then becomes conditional on that user possessing and employing the required combination of set-up configuration parameters for that content. Further, that conditional access for specific users can be changed by selective distribution to variable subsets of users of parametric values needed for the set-up configuration of the in situ key generator in order to encrypt or decrypt content. Conditional access of a user can be revoked by removal of availability of the needed combination of values of set-up configuration parameters to that user or, more conveniently, by changing encryption of content to a new combination of values of the set-up parameters, which combination is not distributed to that particular user.

Such a system can also be used to provide conditional access to encrypted content distributed from a master station to various and varying sets and subsets of receiving users connected to the master station by any telecommunications means. A nonlimiting example is the case of a subscriber-based or "pay-per-view" or "pay-per-"play" network for video or audio distribution. Such networks exist today in the form of cable television networks, direct television subscription and pay-per-view services, and Internet subscription and pay-per-view services. While any number of potential users can receive the signal of such networks, the intention of the service provider is that only paying customers can decrypt and view or hear the encrypted content. Practical and secure means are required to provide cryptographic keys to sets of authorized users varying over time and for specific channels or content, and for the keys themselves also varying over time and for specific channels or content. Availability of the keys at only authorized users' cable modems, set top boxes or other receiving devices, or display equipment, must not interfere with timely reception and decryption of the content. Further, means to provide the needed keys and key changes must be secure in how the necessary information is provided to authorized users' receiving or display equipment, and how the keys are used and protected in such users' receiving or display equipment. There must also be means to revoke authorized decryption for terminated users, nonpaying users or otherwise unauthorized users who gain access to the enabled receiving or display equipment. The invention described herein can provide, change and protect the desired conditional access among authorized users to content provided from a master station.

The nonlimiting example of subscription and pay-per-view cable television service will illustrate. First, consumers shall receive and install or have installed the necessary set top box or equivalent device. In that device, or with it for installation in the receiving television or equivalent audio/video display equipment, is located an in situ key generator with a configuration system. When first installed, the configuration system of the situ key generator at the receiving device will contain a particular combination of values for a set-up configuration, herein called the "X" combination. Upon initial operation, the content distribution network ("CDN") containing one or more master stations of content origination will assign a new combination of set-up values unique to that user (herein called the "a" combination) and transmit that "a" combination in encrypted form based on the "X" combination to the receiving device. Alternatively, the "a" combination may also be physically installed when the receiving device is purchased, delivered or installed. In either case, the CDN also records which network address and user account are associated with the "a" combination.

Thereafter, secure encrypted communication between the user with the "a" combination of set-up parameters and the CDN can uniquely occur via the "a" combination of set-up parameters. The user can securely order services or conduct other transactions via the "a" combination. The CDN operator can securely transmit information, including but not limited to additional combinations of set-up configuration parameters specifically required to receive ordered services such as premium content channels and pay-per-view events. When conditional access for given content must be reauthorized to a revised sub-set of the connected users, new combinations of the set-up configuration parameters values can be cryptographically sent to each continuing and new user via that user's then current personal "a" combination of such values. Revocation of access of any particular user to certain content is preferably accomplished by changing the required combination of values of set-up parameters for decrypting that content and not distributing the new combination to the configuration system of that particular user's in situ key generator.

The configuration system of any user's in situ key generator may then contain a multitude of values for parameters needed to form various combinations of parameter values as specific set-up configurations. For example, a configuration system may contain parameter values to form the following named set-up configurations; among others:
1. the unique "a" combination for that particular user;
2. a "B" combination for basic access or service for all participating users;
3. a "B1" combination for a premium, selective service such as an ongoing premium video channel, for which only certain participating users are authorized;
4. a "B2" combination for a premium, selective service such as a "pay-per-view" or _"pay-per-play" event, for which only certain participating users are authorized; and so on.

The configuration system of the situ key generator can configure that generator with the correct combination based on any of the following methods:
1. Match the one or more varying parameters of the desired configuration from previously stored parameter values with those known in memory to be uniquely associated with the:
   a. Identification of the originating or receiving in situ key generator's location or address;
   b. Identification of the originating or receiving user, user group or other user affiliation;
   c. Identification of the content or content category; or
   d. Identification of the communications channel employed.
2. Identification and transmission between points of origin and receipt of the named combination of parameter values required, as previously stored and named in the configuration system at each point.
3. Transmission and receipt of the needed parameter values for the needed combination to configure the in situ key generator for subsequent use.

Some advantages of the preferred embodiments of the present invention include the following:
1. No key management infrastructure is required since all the keys are internally and automatically generated by the user's in situ key generator.
2. There is no requirement to transfer or store keys among users or the service provider(s);
3. The cryptographic keys are unknown to the users in the authorized community;
4. Because the entire authorized user community can also be time or event synchronized, frequent key changes for any given generator configuration can also be made automatically and seamlessly, at any desired frequency.
5. The system is symmetric key baselined, using the popular Triple DES algorithm but can be applied to any encryption algorithm of choice;
6. Up to four or more separable setup configuration parameter values for any given key generator configuration ensure confidentiality of each system key generator configuration.
7. The cryptographic infrastructure is completely self-synchronizing and is substantially maintenance free;
8. Because there is no key distribution, the infrastructure eliminates third party certificate authorities and can thus be self-certifying and authenticating;
9. The cryptographic infrastructure offers opportunities for specialized network security layers and topographies through the use of selective and changeable configuration management of the connected in situ key generators.
10. The all-hardware mechanism can provide cryptography communication at pipe speed.

BRIEF DESCRIPTION OF THE ATTACHED DRAWINGS

DETAILED DESCRIPTION OF PREFERRED EMBODIMENTS

Preferred embodiment of the present invention will now be described with references to FIGS. 1 and 2. Although an example of a cable television network is described below, it should be understood by ones skilled in the art that the present invention can be applied to many other kinds of communication networks.

Figure 1:
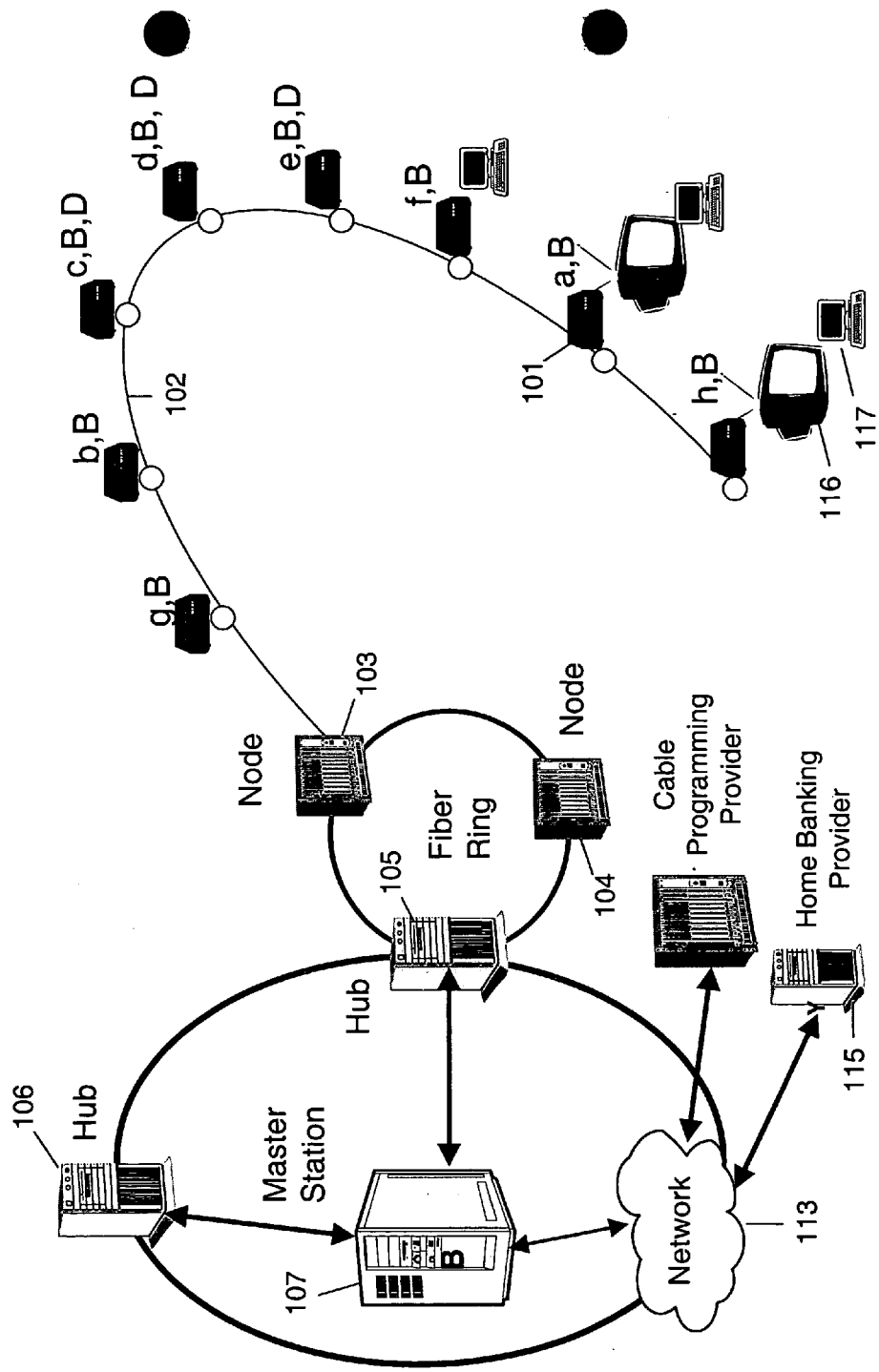
FIG. 1 is a block diagram of a cryptographic communication system using in situ generated cryptographic key generators.

In a cryptographic communication system in accordance with the preferred embodiment of the present invention, each user preferably possesses or has access to a pseudo-random key generator (PKG) located within set-top boxes or cable modems 101 or the associated televisions 116 or computer terminals 117 like those described in FIG. 1. Although the terms "set top box" or "cable modem" are used throughout the description, it should be understood by one skilled in the art that other communication interfaces or devices or display devices may be used as an equivalent alternative for location of the PKG.

In accordance with the preferred embodiment of the present invention, the user of set-top box or cable modem 101 is part of a greater user community 102, with each user possessing a set-top box or cable modem like 101 connected to a Node 103. A Node can also be referred to as a "Headend", or Cable Modem Termination System (CMTS)". Node 103, together with other Nodes like 104 are connected to Hubs like 105 and 106, which in turn are preferably connected to a Master Station 107. The pseudo-random key generators (PKGs), preferably located within the set-top boxes or cable modem 101, are given various modes of operation through the use of initialization or set-up values. An initialization seed is a random number that acts as a starting pointer for the pseudo-random number generator (PRN) within the PKG, which in turn sequentially generates a series of numerical strings that can be used to compose a series of unique cryptographic keys, based on the balance of the PKG configuration as well as time or event synchronization. For a given pseudo-random key generator, different "implants" of different seeds result in different unique sets of keys, even with all other set-up configuration parameter values being the same.

In accordance with the preferred embodiment of the present invention, a user's set-top box or cable modem 101 is given an individual seed as represented by "a," "b" to "h," and so on. The use of individualized seeds provides to each user individualized cryptographic key generation for private, secure communications, making each user unique with respect to the service provider and other users. Such operation is described in more detail in FIG. 2.

In a cryptographic communication system according to the preferred embodiment of the present invention, the service provider may be able to provide to users of the authorized community certain content that all the users may view, but should not be received by users outside of the authorized community. In this instance, it is more efficient to use a common, unique series of encryption keys to encrypt the data for all users of the community, rather than encrypting the data with the individual, unique series of keys of each user authorized to receive the content. Authorization to receive and view the multicast data may be accomplished through the use of a common multicast seed (denoted as "B" in FIG. 1), which is preferably "implanted" into each user's set top box or cable modem 101. The possession of a common multicast seed allows each user to generate the necessary keys for decryption of the multicast-media that otherwise would be unviewable. In this instance, the service provider could establish a secured multicast channel to the user for content without the use of another media such as a phone line to order the content. The common multicast seed B can be requested and received by message exchanges between the service provider and the user via the secured data communication employing encryption using the user's individual seed.

Additionally, a multicast seed (denoted as "D" in FIG. 1) may be implanted into only certain user's set top boxes or cable modems 101. The possession of this selective multicast seed allows only those users who have paid for or are otherwise authorized to receive specific content to decrypt that specific content, such as a premium channel, a pay-per-view event or other restricted content. The selective multicast seed "D" can be requested and received by message exchanges between the service or information provider and the user via the secured data communication employing encryption using the user's individual seed.

As a standard option, the service provider or user may choose to transmit certain data, such as an advertisement by the service provider, in the clear (i.e. without any cryptography). While operating in the clear mode, data communication between the user and the service provider is unprotected and may be vulnerable to third party interception. Accordingly, it is preferable that such communications involve only data that do not include any private or non-public data, or that is generally receivable via other means.

Figure 2:
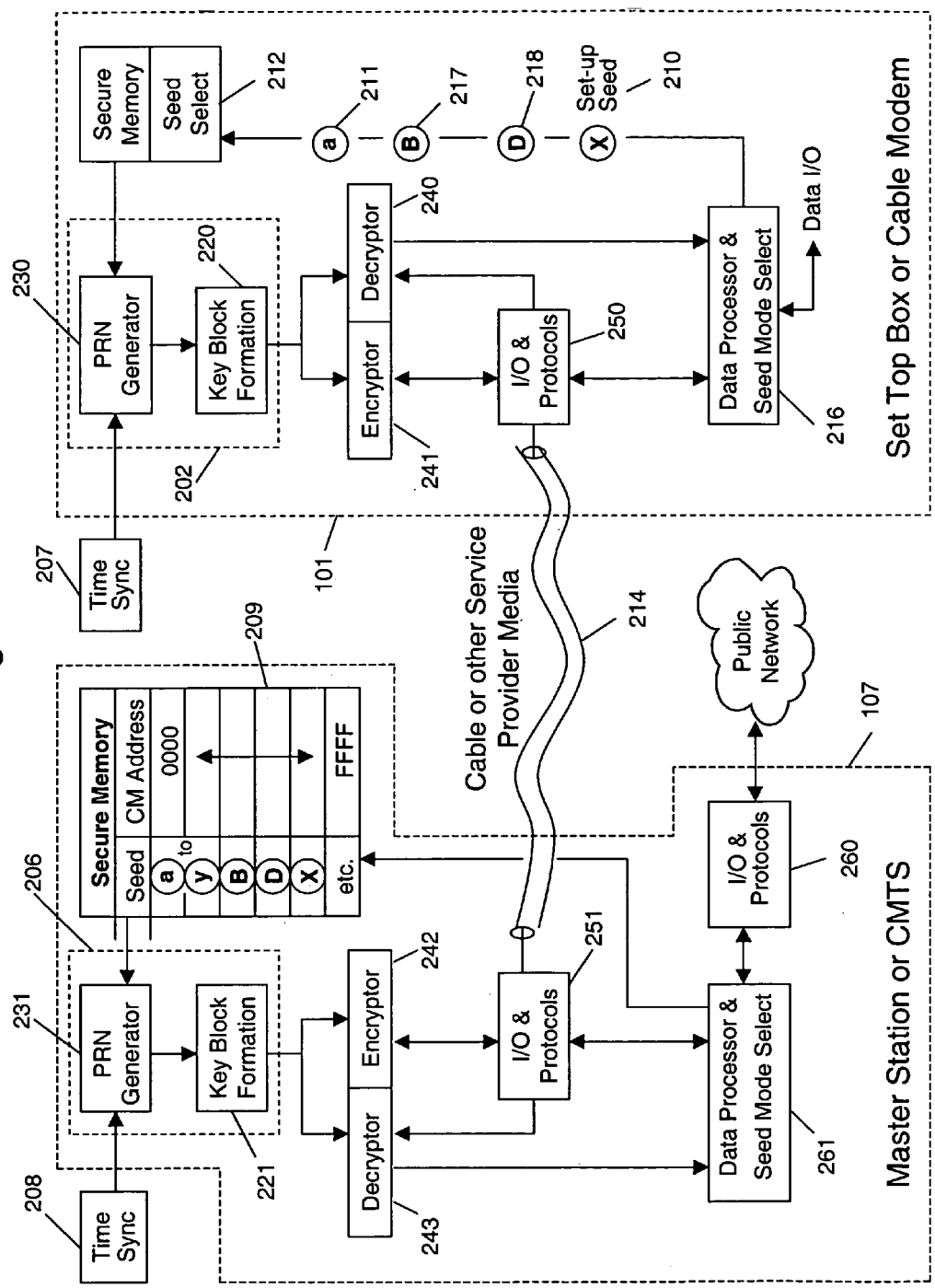
FIG. 2 is a more detailed block diagram of certain portions of the system illustrated in FIG. 1.

FIG. 2 illustrates further details of the present invention. In accordance with the preferred embodiment of the present invention, a set-top box or cable modem 101 is purchased for or installed in a user's location. As the box 101 is powered up upon installation and performing various initialization functions, it begins to configure the security functionality based on a set-up configuration loaded into the box at manufacture, purchase or installation. While initializing, or shortly thereafter, the set top box or cable modem preferably communicates to the Master Station 107 to signify that the particular set top box or cable modem has been initialized. Subsequently, the Master Station 107, preferably using its pseudo-random key generator system (PKG) 206 and the initial set-up configuration of the box or modem 101, assigns to set top box or cable modem 101 a unique identifier, address, serial number, or other equivalent address/identification. The set-top box or cable modem 101 and the Master Station 107 then verify time synchronization preferably with the provided network time signals 207 and 208.

In configuring the user set top box or cable modem 101 in accordance with the preferred embodiment of the present invention, the box or modem 101 preferably is given a temporary set-up seed 210 by the installer. This set-up seed, denoted as "X" in FIG. 2, is used to initialize the PKG 202 and generate temporary keys for encrypting communication. Upon setup, the set top box or cable modem contacts Master Station 107 of the service provider, which has stored within its secure memory the same set-up seed "X" and can therefore decipher the incoming communication from the activated set top box or cable modem 101. After a secure channel is established using the set-up seed 210, the Master Station 107 then sends to the set top box or cable modem 101 a new, permanent, user unique individual seed "a" 211, which is decrypted in the set-top box or cable modem 101 and then stored in a secure memory 212. The Master Station 107 then stores the same seed "a" just transmitted in its secure memory 209 and links it to the new user's address/identification function assigned earlier. Once this operation is complete, the temporary set-up seed "X" in the user's set-top box or cable modem 101 is preferably deleted. Subsequently, the individual "a" seed 211 may be replaced and one or more common multicast seeds such as "B" 217 as well as one or more selective multicast seeds, such as "D" 218, that may be sent from the Master Station 107 to the box or modem 101 via encryption using the individual seed "a" 211. It should be noted that the interaction described involving the Master Station can alternately be applied to the Node, Headend, or Cable Modem Termination System (CMTS). In other words, the security functionality can be part of the Master Station or the CMTS, or both, and can be extended externally to the local service provider's network.

After the initialization process is complete, the user's individual seed 211 (denoted as "a" in FIG. 2), which is also stored at the Master Station 107, initializes the user's PKG 202 to generate series of unique time or event synchronized keys for the life of the user's system if so desired by the service provider. As shown in FIG. 2, the PKG 202 preferably includes a PRN generator 230 and a key block formation device 220. The PRN generator 230 generates data strings that is then used by the key block formation device 220 to compose encryption/decryption keys. The key block formation device can be anything from a data-mapping table to a data assembler. In an alternative embodiment, the PKG may include only the PRN generator 230, the data from which can be used directly as encryption/decryption keys. The encryptor 241 and decryptor 240 use the generated keys to encrypt/decrypt data, which is preferably processed through the I/O protocols device 250 and a data processor 216. In the preferred embodiment according to the present invention, the data processor 216, by identifying the type of incoming/outgoing data, can also act as a selector in selecting which seed value to use for generating keys. For instance, if the data processor 216 identifies the incoming data as a multicast data, the data processor will then select seed "B" 217 as the seed to be used in generating the needed keys for decrypting the multicast data. The same kind of operation is similarly duplicated at the master station 107.

The generated keys are used for cryptographic communication between the user and the service provider, and between the user and other users of the authorized community or between the user and any outside parties that may also be subscribers to the service provider's security system via the Master Station 107 that may serve as a decrypting and encrypting gateway.

Frequency of key changes is preferably set by the service provider in both the Master Station/CMTS 107 and the set-top box/cable modem, and may be set to change keys once every several days or once every fraction of a second. The Master Station 107 stores all the individual set-up seeds given to users in a secure memory 209. The secure memory 209 matches the various individual seeds (denoted as "a" to "y" in FIG. 2) to the address or identification functions assigned to each user (denoted for illustrative purposes as 0000 to FFFF in FIG. 2). As the numbers of users increase, the system can be scaled accordingly with additional storage devices for storing individual seeds.

Although FIGS. 1 and 2 show a hardware embodiment of the present invention, it is understood that the present invention can be implemented using software controls. For instance, the user communication interface may very well be a personal computer or a television capable of downloading or reading from any kind of computer readable storage medium software that contains instructions for causing a processor to execute all the above-mentioned functions. In such case, the pseudo-random generator (PKG) may simply be a microprocessor programmed to pseudo-randomly generate data strings or cryptographic keys. The same type of software implementation may be done at the service provider's end. Similarly, the present invention may also be implemented by programming other data processors to perform the necessary steps.

As previously mentioned, a cryptographic communication system according to the preferred embodiment of the present invention can operate in various modes including: (a) secured communication between the different users within the authorized user community; (b) secured communication between a user of the authorized community to the service provider; (c) secured communication between a user of the authorized community to parties outside the authorized community; and (d) three way communications between the service provider, the various users within the authorized community, and outside content providers. Each of the different operating modes will now be described in further detail below.

(a) Communication Between Users within the Authorized User Community

In one mode of operation in accordance with the preferred embodiment of the present invention, users within the authorized community may communicate securely with each other using their own individual seeds. Specifically, when user "a" with set-top-box or cable modem 101 desires to securely communicate with another authorized user (for instance user "y") having the same kind or compatible set-top box, user "a" first encrypts the outgoing data using her own individual seed in her PKG. As previously discussed, the PKG for each set top box preferably generates a sequence of unique keys whereby the sequence is initiated by the individual seed 211. The encrypted data is then sent to the Master Station 107 using the service provider's network 214. As the encrypted data reaches the Master Station 107, the memory 209 identifies the source of the data and locates the corresponding seed "a" assigned to that address for user "a." Once the corresponding seed is identified, it is fed into the Master Station PKG 206 to generate the necessary key(s) for decrypting the received data. The Master Station 107 also preferably identifies, from the received data, the intended recipient of the data. Upon identification of the intended recipient, in this example user "y", the Master Station 107 retrieves from secure memory 209 the corresponding seed "y." The data is then re-encrypted using the seed of the intended recipient of the data, and is then sent to user "y" via network 214.

(b) Communication Between the User and the Network Service Provider

A user with set-top box 101 may desire to order premium programming from the service provider that is not available "in the clear" (i.e., via public broadcast), such as a premium channel or a specific pay-per-view program. Using a secure channel established through the use of his or her own set-top box 101, messages can be exchanged between the user and the network service provider to accomplish the necessary set-up functions to receive the service.

More specifically, the service provider's Master Station 107 may assign a configurable multicast seed, such as a common seed "B" or a selective seed "D", that may be used to encrypt premium content. Premium multicast operations are initiated by cryptographically sending the seed "B" or "D" to the set top box 101. This configurable common or selective multicast seed "B" or "D," respectively, is preferably stored in the users equipment for use by the users' PKG 202- to generate the keys necessary for decrypting the premium multicast information. More particularly, as premium or specific content is received by data processor 216 of the set top box 101, the data received will indicate itself as premium content and that it requires keys generated from multicast seed "B" or "D", as the case may be, in order to be decrypted and viewed. When the channel is no longer authorized or the program information has concluded, the seed "B" or "D" is either deleted in the set-top box 101 or may be discarded or replaced for continuing authorized users in the Master Station/CMTS 107.

(c) Communication Between a User and a Party Outside of the Authorized Community As previously discussed, users within the authorized community may always have the option to communicate in the clear mode with other users within the community or with outside parties. To facilitate secured communications between a user and an outside party, such as a home banking provider 115 (FIG. 1), the data from the user is first routed to the Master Station in a secured mode, preferably using the user's individual keys generated from the user's own PKG. The data is then decrypted using a matching key generated by the Master Station 107, (See FIG. 2) and then transmitted to the home banking provider 115 in a separately secured channel established between the Master Station 107 and the home banking provider 115. The secured channel between the Master Station 107 and an outside party may be established via any encryption system, including but not limited to the public key infrastructure.

(d) Three way Communication Between the Service Provider, a User of the Authorized Community, and an Outside Party As previously mentioned, if data is to be transmitted to an outside party through the public network, then it may be necessary to create a secure communication channel with that outside party. In the above example, the banking provider 115 can also be a subscriber to the service provider and possess its own unique PKG to generate keys as described in this invention. In that situation, communication between the user and the banking provider would be treated similarly as secured communication between two users of the authorized community.

In another embodiment of the cryptographic communication system according to the present invention, the Master Station 107 may unilaterally revoke individual seeds at any time, such as in the event the service is terminated by the user or by the service provider, the set-top box/cable modem 101 is moved to another geographic location, or in case of other situations in which security of the data channel is suspected of being compromised. Revocation of a user's subscription is done by removing the user's individual seed functionality at the Master Station/CMTS's end without the need to electronically or physically interact with the set-top box at the user's end. More specifically, the individual seed of a user can be identified and deleted or disabled from the secure memory 209, thereby preventing communication between the Master Station 107 and the particular set top box that is to be disabled.

It should be noted that the present invention may be embodied in forms other than the preferred embodiments described above without departing from the spirit or essential characteristics thereof. The preferred embodiments are therefore to be considered in all aspects as illustrative and not restrictive, and all changes or alternatives that fall within the meaning and range or equivalency of the claims are intended to be embraced within them.

We claim:

1. A cryptographic communication system comprising:
   a plurality of user communication interfaces, each of said communication interfaces including:
   a data transceiver;
   a string generator;
   a data processor connected to said string generator; and
   a memory connected to said string generator, said memory having stored a unique seed value and a common seed value,
   wherein the data processor processes data received by or to be transmitted by the data transceiver using data string generated by the string generator,
   wherein the unique seed value for each of said plurality of user communication interfaces are unique to the respective communication interface, and wherein the common seed value stored in the memory of each of said plurality of communication interfaces is common to all of the plurality of communication interfaces, and
   wherein the string generator generates data string using the unique seed value if the data to be transmitted or received by the data transceiver is unicast data intended to be received by one of said plurality of communication interfaces, and generates data string using the common seed value if the data received is designated as multicast data intended to be received by all of said plurality of communication interfaces; and
   a master station, said master station including:
   a second data transceiver;
   a second string generator;
   a second data processor connected to said second string generator; and
   a second memory connected to said second string generator, said second memory having stored each of the unique seed value stored in the plurality of communication interfaces and the common seed value,
   wherein the second data processor processes data to be transmitted by or received by the second data transceiver using data string generated by the second string generator, and
   wherein the second string generator generates data string using one or more of the unique seed values if the data to be transmitted by or received by the second data transceiver is intended to be received by select ones of said plurality of communication interfaces, and generates data string using the common seed value if the data to be transmitted is intended to be received by all of the plurality of communication interfaces.

2. The cryptographic communication system according to claim 1,
   wherein said string generator is a pseudo-random string generator, and
   wherein said second string generator is a pseudo-random string generator.

3. The cryptographic communication system according to claim 1,
   wherein each of said plurality of user communication interface further includes a key block formation device, and
   wherein said master station further includes a second key block formation device.

4. The cryptographic communication according to claim 1, wherein each of said plurality of user communication interface is connected to said master station through a communication network.

5. The cryptographic communication according to claim 1, wherein each of said plurality of user communication interface communicates with the master station via a wireless network.

6. The cryptographic communication system according to claim 1,
   wherein said second memory of said master station stores a user address value for each of said plurality of user communication interface.

7. The cryptographic communication system according to claim 6, wherein each of the unique seed values stored in said second memory is referenced to by the user address value corresponding to the user communication interface in which the unique seed value is stored.

8. The cryptographic communication system according to claim 1,
   wherein said second memory of said master station stores a user identification for each of said plurality of user communication interface.

9. The cryptographic communication system according to claim 8, wherein each of the unique seed values stored in said second memory is referenced to by the user identification corresponding to the user communication interface in which the seed value is stored.

* * * * *